(12) United States Patent
Argillier et al.

(10) Patent No.: US 9,187,183 B2
(45) Date of Patent: Nov. 17, 2015

(54) COMBINED RESCUE BEACON AND FLIGHT RECORDER DEVICE FOR AN AIRCRAFT AND AIRCRAFT PROVIDED WITH SUCH A DEVICE

(75) Inventors: Fabien Argillier, Boulogne Billancourt (FR); Michel Bermudez, Suresnes (FR); Hichem Smaoui, Paris (FR); Emmanuel Joubert, Issy les Moulineaux (FR); Thierry Pelegrin, Viroflay (FR)

(73) Assignee: AIRBUS GROUP SAS, Paris (FR)

( * ) Notice: Subject to any disclaimer, the term of this patent is extended or adjusted under 35 U.S.C. 154(b) by 42 days.

(21) Appl. No.: 14/128,571

(22) PCT Filed: Jun. 21, 2012

(86) PCT No.: PCT/EP2012/061987
§ 371 (c)(1),
(2), (4) Date: Jan. 28, 2014

(87) PCT Pub. No.: WO2012/175619
PCT Pub. Date: Dec. 27, 2012

(65) Prior Publication Data
US 2014/0142803 A1    May 22, 2014

(30) Foreign Application Priority Data

Jun. 21, 2011   (FR) ...................................... 11 55441

(51) Int. Cl.
*G01M 17/00*   (2006.01)
*B64D 47/06*   (2006.01)
*B64D 45/00*   (2006.01)
*G01S 5/02*    (2010.01)

(52) U.S. Cl.
CPC ................ *B64D 45/00* (2013.01); *G01S 5/0231* (2013.01); *B64D 2045/0065* (2013.01); *B64D 2211/00* (2013.01)

(58) Field of Classification Search
CPC ......... G01S 5/0231; G01S 5/04; G01S 19/17; G01S 3/10; G01S 3/46; G01S 5/0027; G01S 5/0215; G01S 13/9035; G01S 1/02; G01S 1/68; G01S 3/48; G01S 5/02; G01S 5/0226; G01S 5/06; B64D 2045/0065
USPC ........... 701/33.4, 3, 11, 14, 18; 340/948, 961, 340/963, 981
See application file for complete search history.

(56) References Cited

U.S. PATENT DOCUMENTS

| | | | |
|---|---|---|---|
| 2,552,969 A | 5/1951 | Holman | |
| 2,959,671 A | 11/1960 | Stevinson | |
| 3,140,847 A | 7/1964 | Ames, Jr. | |

(Continued)

FOREIGN PATENT DOCUMENTS

| | | | |
|---|---|---|---|
| CH | 701262 A2 | 12/2010 | |
| DE | 19609501 | * 9/1997 | |
| WO | 2011010942 A1 | 1/2011 | |

*Primary Examiner* — Muhammad Shafi
(74) *Attorney, Agent, or Firm* — Im IP Law PLLC; C. Andrew IM

(57) ABSTRACT

A combined rescue beacon and flight recorder device for an airplane is ejectable, buoyant and/or provided with flotation devices. The combined rescue beacon and flight recorder device comprises a frame provided with at least one outer side surface having a solar panel. The combined rescue beacon and flight recorder device is configured to be placed in a housing created in an airfoil element of the aircraft.

18 Claims, 4 Drawing Sheets

(56) References Cited

U.S. PATENT DOCUMENTS

| | | | |
|---|---|---|---|
| 3,766,560 A * | 10/1973 | Bornhorst et al. | 342/428 |
| 4,009,051 A | 2/1977 | Kazis et al. | |
| 4,944,401 A * | 7/1990 | Groenewegen | 206/521 |
| 2007/0115174 A1* | 5/2007 | Herrick | 342/420 |
| 2009/0027269 A1* | 1/2009 | Dutruc | 342/385 |
| 2010/0271198 A1* | 10/2010 | Boling et al. | 340/539.1 |

\* cited by examiner

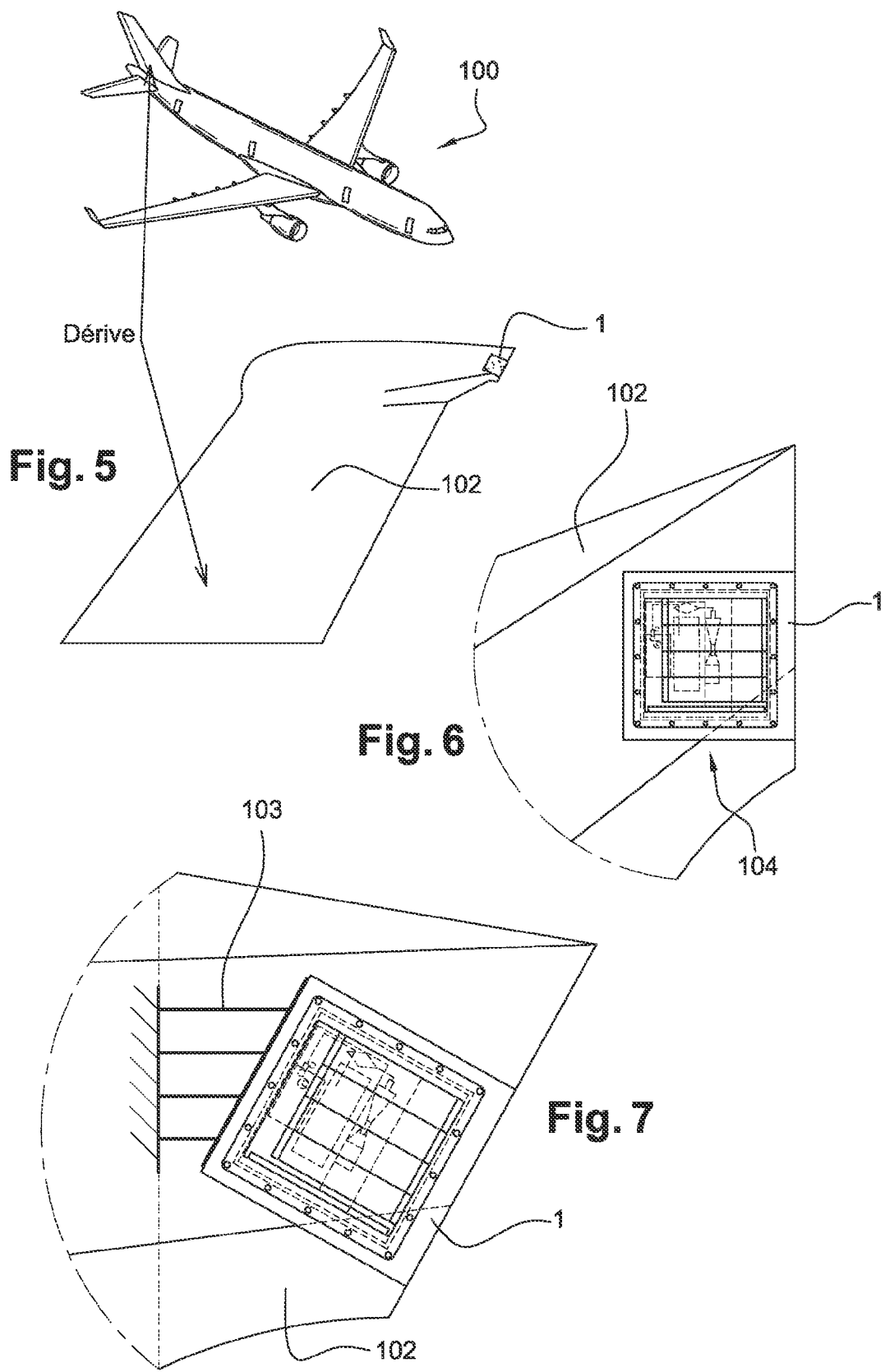

COMBINED RESCUE BEACON AND FLIGHT RECORDER DEVICE FOR AN AIRCRAFT AND AIRCRAFT PROVIDED WITH SUCH A DEVICE

RELATED APPLICATIONS

This application is a §371 application from PCT/EP2012/061987 filed Jun. 21, 2012, which claims priority from French Patent Application No. 11 55441 filed Jun. 21, 2011, each of which is herein incorporated by reference in its entirety.

TECHNICAL FIELD OF THE INVENTION

The present invention relates to a combined emergency beacon and flight recorder device, which is buoyant and is entirely or partially solar powered, for an aircraft, and to an aircraft equipped with such a device.

BACKGROUND OF THE INVENTION

It is known to equip aircrafts with flight recorders which are generally arranged in a part of the aircraft which is unlikely to suffer severe damage in the event of an accident.

Flight recorders, known as "black boxes", are compulsory safety equipment on transport airplanes.

They record numerous flight parameters, as well as cockpit conversations, and are an important tool in determining and explaining the circumstances and causes of a civil aviation accident or incident.

Flight recorders are designed so that their contents are protected from severe conditions: acceleration greater than 3400 g, a temperature of 1100° C. for one hour, submersion at a depth of six thousand meters for one month.

The difficulties currently faced in recovering flight recorders in the event of an accident raise questions as to the suitability of current technology for recovering flight data for accidents over oceans or remote regions.

It is known to produce ejectable flight recorders and document U.S. Pat. No. 3,140,847 in particular describes an ejectable recorder placed in the tail of the fuselage of an aircraft and document CH 701262 describes an ejectable recorder having a parachute and housed on one side of the fuselage forward of the vertical stabilizer root.

OBJECT AND SUMMARY OF THE INVENTION

In light of this prior art, the present invention proposes a combined emergency beacon and flight recorder device which is ejectable, buoyant and/or is fitted with flotation means, for an aircraft, which comprises a frame that has at least one outer side face fitted with a solar panel and is designed to fit into a housing created in an airfoil element of the aircraft.

Advantageously, the device comprises a battery, for supplying the emergency beacon and the flight recorder with power, which is connected to the solar panel, the device thus comprising a stand-alone power supply whether the device is in position in the aircraft or has been ejected.

The device advantageously comprises a stiffening structure, particularly of the honeycomb type, providing sufficient stiffness for it to be a structural element of the airfoil and making the device resistant to impacts.

The device is preferably such that its ratio of weight to lifting area is designed to provide it with enough lift such that, once ejected, its descent is slowed.

According to one particular embodiment, the device of the invention comprises retractable aerodynamic braking means which can be deployed after ejection.

The device is preferably such that its mass-to-volume ratio is designed to make it buoyant.

According to one advantageous embodiment, the device comprises means without electrical contact, such as optical and/or radio means, for connecting to systems of the aircraft.

According to one alternative or complementary embodiment, the device comprises disconnectable means for connecting electrically to systems of the aircraft.

According to one particularly advantageous embodiment, the device comprises a boxed sandwich structure incorporating the beacon and the recorder and forming all or part of said flotation means.

The device of the invention preferably comprises means for measuring acceleration and/or rate of descent and/or impact and means for jettisoning which can be activated when a threshold value for acceleration and/or rate of descent is exceeded and/or in the event of an impact.

According to one particular embodiment, the device comprises complementary power supply means powered by renewable energy such as wind and/or wave energy.

The invention also relates to an aircraft, comprising a combined emergency beacon and flight recorder device according to the invention, for which said device is formed as a structural element of said airfoil element of said aircraft.

According to one alternative or complementary embodiment of the aircraft, said device is formed as an aerodynamic panel element on at least one face of said airfoil element.

The aircraft is advantageously such that the device comprises solar panels on both its side faces and/or is formed as an aerodynamic panel element on both faces of said airfoil element.

More particularly, said airfoil element is a vertical stabilizer of the aircraft.

According to one particular embodiment, the airfoil element comprises means for receiving the frame of said device in the form of a construction forming a structural element of the airfoil element.

Advantageously, the construction is U-shaped, the device being housed inside the U in the manner of a removable drawer module.

BRIEF DESCRIPTION OF THE DRAWINGS

Other features and advantages of the invention will be apparent on reading the following description of a non-limiting exemplary embodiment of the invention, with reference to the drawings, in which:

FIG. 5 shows an aircraft and an exemplary position of a device according to the invention;

FIG. 6 is an enlarged view of the installation of the device according to FIG. 5;

FIG. 7 shows an exemplary attachment of the device according to FIG. 6;

DETAILED DESCRIPTION OF THE EMBODIMENTS

It is an object of the invention to propose an emergency beacon and flight data recorder system which is integrated into the structure, is ejectable, buoyant and is entirely or partially powered by renewable energy.

The solution proposed by the present invention makes it possible to provide, at the design stage of the aircraft, for the installation of a device comprising a flight data recorder system and a distress beacon, this device being integrated into the structure of the aircraft.

Furthermore, the device is positioned such that it can be automatically ejected upon a command from the crew, or even without such a command, when the fact that the aircraft suffers a strong impact or a sudden drop is detected.

Figure 1:
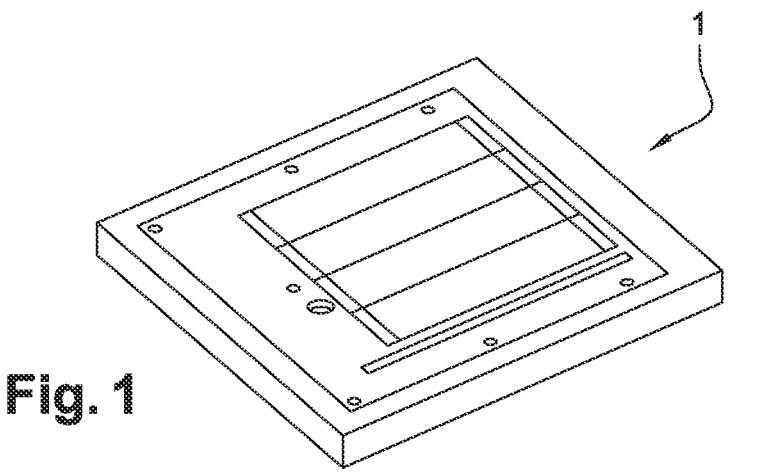
FIG. 1 is a perspective view of a schematic example of an embodiment of a device according to the invention.

The device 1 of the invention is shown in perspective in FIG. 1.

Figure 2:
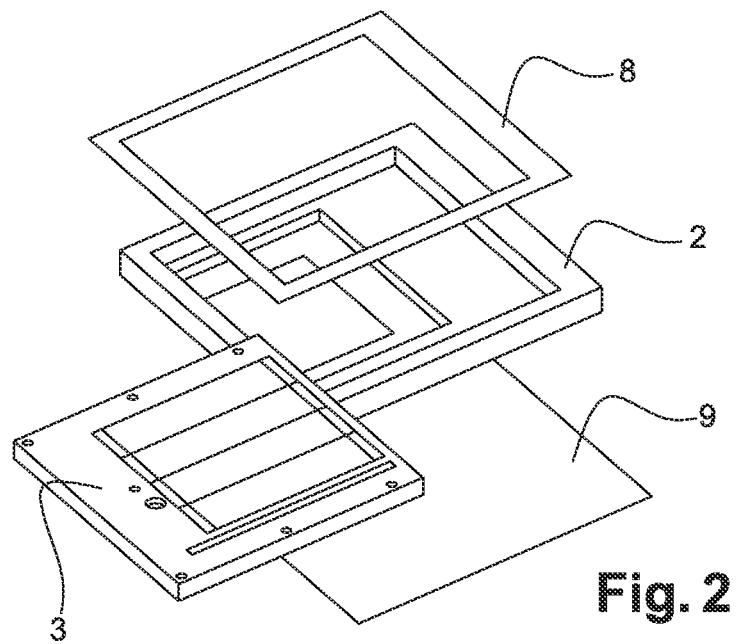
FIG. 2 is an exploded perspective view of the device of FIG. 1.

As shown in FIG. 2, which is an exploded view of FIG. 1, the device comprises a frame 2 having at least one outer side face fitted with a solar panel 3.

The frame 2 is completed, in this example, by an openwork skin 8 and a base 9.

Figure 3:
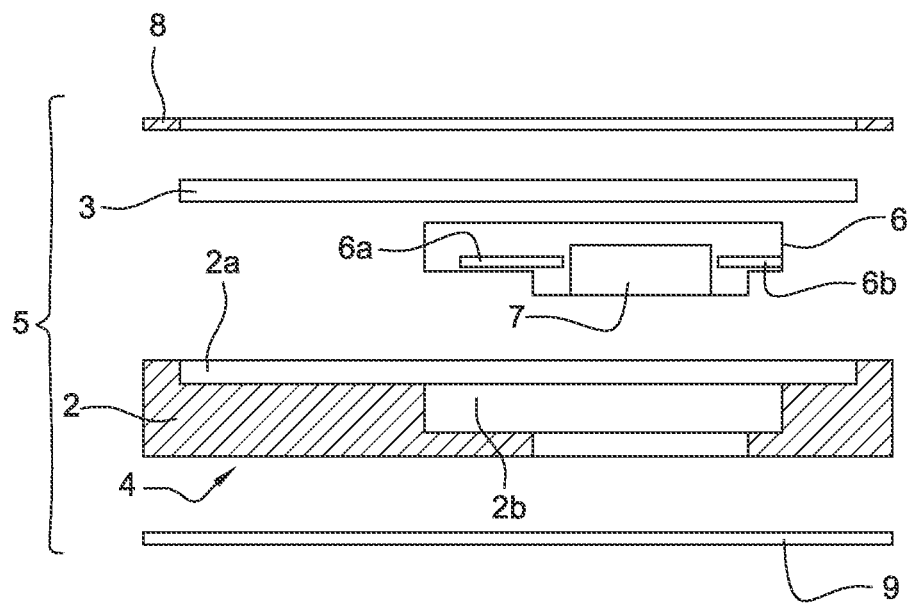
FIG. 3 is a side view of a partial cutaway of the device shown in FIG. 2.

The solar panel 3, which may be equipped with its control and regulating modules, is inserted as shown in FIG. 3 into a recess 2a in the frame 2 above an electronics module 6 encompassing a battery 7, the beacon 6a and the flight recorder module 6b.

Advantageously, the solar panel 3 and the electronics module 6 encompassing a battery 7, the beacon 6a and the flight recorder module 6b are attached to the frame 2 so as to allow simple maintenance of said device.

The electronics module 6 is arranged in a second recess 2b in the frame which is closed on the inner side face by a base 9.

Figure 4:
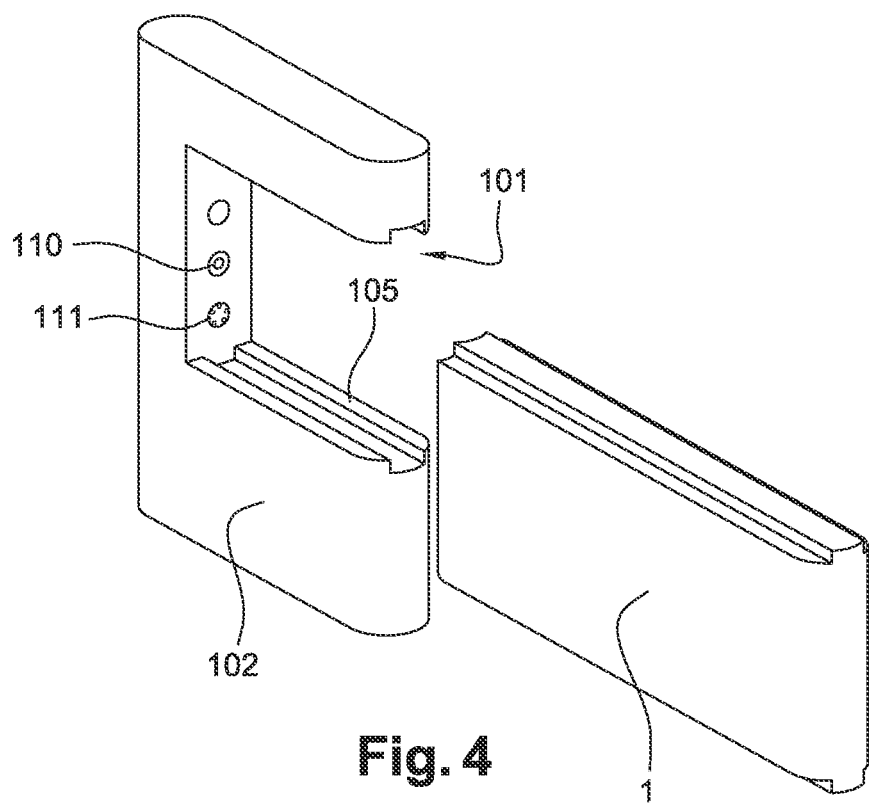
FIG. 4 is a close-up perspective view of an installation of an exemplary embodiment of the device of the invention in an aircraft airfoil element.

As shown particularly in the examples of FIGS. 4 and 6, the device 1 is positioned in a housing created in a airfoil element 102 of the aircraft.

As shown in FIG. 4, the housing is open on two faces of the airfoil element 102, in this case the vertical stabilizer of an aircraft.

As shown in FIG. 6, the housing is open on at least one of the two faces of the vertical stabilizer 102.

In the case of FIG. 4, the device comprises solar panels on its two side faces, one solar panel replacing the base 9 of FIG. 3, and is formed as an aerodynamic panel element 104 on both faces of said airfoil element 102.

In the case of FIG. 6, the device is formed as an aerodynamic panel element 104 on one face of said airfoil element 102.

As shown in FIG. 4, the device is received in a rigid cradle 105 such that the device and its cradle are formed as a structural element of the airfoil element 102 of the aircraft, its structure being designed to transmit forces acting on the aircraft structure when in flight in this part of the airfoil element and in the event of a sudden impact, the cradle keeping its structural properties after the device has been ejected.

As stated above, the device comprises a battery 7, for supplying the emergency beacon and the flight recorder with power, which is connected to the solar panel, the device thus comprising a stand-alone power supply whether the device is in position in the aircraft or has been ejected.

In order to receive flight parameter data or to record cockpit conversations as traditionally known in the flight recorder function, the device comprises means for connecting to the relevant equipment of the airplane or aircraft, wherein these means can be means without electrical contact, such as optical and/or radio means, and/or disconnectable means for connecting electrically to systems of the aircraft.

These means are shown schematically in FIG. 4, with reference number 110 indicating an optical means and 111 indicating a disconnectable electrical connection means, for example a known piston contact connector.

With respect once again to FIG. 3, the electronic systems are integrated into a stiffening structure such as a foam or honeycomb 4 of the self-stiffened structure type covered by a composite or metal envelope formed by the lid 8 incorporating the solar panel 3 and the transmitter antenna of the beacon.

The assembly is watertight and buoyant.

The device owes its buoyancy to being integrated into a boxed sandwich structure 5 incorporating the beacon 6a and the recorder 6b, the whole having an appropriate mass-to-volume ratio.

FIG. 7 shows an exemplary attachment of the device in the airfoil element of the aircraft, in this case a vertical stabilizer of an airplane, the device being connected to the airfoil element by anchoring means 103 comprising electrical, mechanical, pneumatic or pyrotechnic means for jettisoning or ejecting the device.

The aircraft comprises means for receiving the frame of said device in the form of a U-shaped construction 105 inside which the device 1 is housed in the manner of a removable drawer module, thus facilitating the jettisoning and maintenance of the latter.

The device comprises means for measuring acceleration and/or rate of descent and the means for jettisoning or ejecting can be activated, when a threshold value for acceleration and/or impact and/or rate of descent is exceeded, so as to eject the device.

The means for jettisoning are preferably activated before the crash, or at the very moment that the aircraft crashes, using the means for measuring acceleration and/or rate of descent, the measuring means consisting for example of one or more accelerometers, an altimeter or other suitable means for detecting an accident situation.

It is also possible that the means for jettisoning can be activated on the pilot's command.

In order to slow its descent and preserve the integrity of its electronic components, the combined emergency beacon and flight recorder device can be such that its ratio of weight to lifting area, together with a winglet system which can be deployed once ejected, are designed to provide it with enough lift such that, once ejected, its descent is slowed, in particular such that it spins while falling, thereby softening its impact with the ground.

Figure 8:
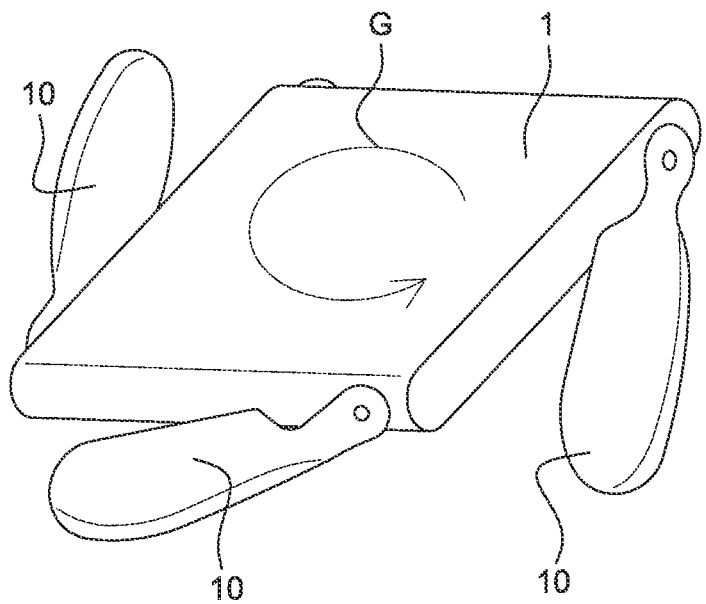
FIG. 8 shows a first exemplary embodiment of a device of the invention having deployable winglets.

The example of FIG. 8 shows a combined beacon and recorder device 1 comprising deployable winglets in the form of blades 10 designed to be inclined with respect to the plane of the device and to impart a gyratory movement G to the device, thus braking its descent.

Figure 9A:
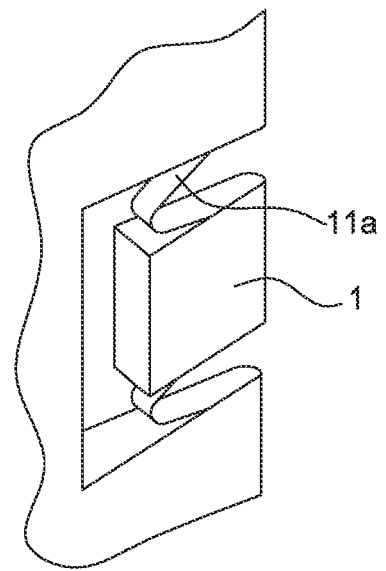
FIGS. 9A and 9B show a second exemplary embodiment of a device of the invention having deployable winglets.
Figure 9B:
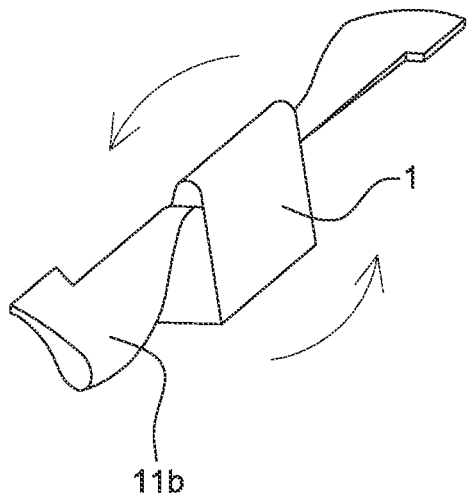

The example of FIGS. 9A and 9B provides winglets 11a, 11b which are folded away in the position 11a when the device 1 is in its housing and are deployed into the position 11b when the device is freed from its housing, such that these winglets, deployed by elastic means, act as a rotor which slows the descent of the device by auto-rotation, the winglets constituting retractable aerodynamic braking means.

In an enhanced version, the device comprises complementary power supply means powered by renewable energy such as wind and/or wave energy.

In order to have a guaranteed power supply, the device is entirely or partially powered by renewable energy sources.

Using renewable energy increases the endurance of the system, facilitating a search at sea for the wreckage of the airplane and maritime rescue operations—even in bad weather—by providing a location continuously and for a long time; it makes it possible to track wreckage even when it is not possible to effect a rescue immediately after the crash, to track possible survivors, and to better understand the circumstances of the accident and obtain the flight parameters and data as quickly as possible.

As well as the increased endurance of the battery as the device drifts after ejection, this integrated concept also charges the battery during the aircraft's flight phases, thus allowing it to be entirely autonomous, whereby the device requires no systems for recharging the battery in the aircraft.

The ejectable device is designed to detach from the structure while maintaining its integrity when it hits the water.

It is placed in a region of the aircraft which is protected from direct impacts, for example the vertical stabilizer of the airplane as shown in FIGS. 5 and 6 in which the device 1 is arranged at the top and rear of the vertical stabilizer 102, which also provides a position with appropriate exposure to the sun.

The proposed solution is thus a system which may be integrated as a part of the structure of the aircraft or as an aerodynamic part on a portion of the aircraft.

As well as the flight recorder, the device comprises an emergency beacon in the form of a GPS transmitter or various transmitting elements such as high frequency and low frequency transmitters which are triggered when the system is ejected and which transmit a distress signal.

Due to the limited power consumption of the device, a version without a battery can be studied for entirely solar-powered operation, allowing for a weight advantage at the cost of non-continuous operation.

The power requirements of such a device are of the order of some tens of watts/hour per day, which is compatible with the transmitting and solar recharging capacity of a beacon drifting on the surface of a moving body of water.

The invention, which is not limited to the examples shown (in particular, two devices can be provided in a manner arranged on the tail unit of an airplane or other airfoil element), can be used in various locating situations or searches (for aircraft, ships, etc.). It allows the search for wreckage or rescue operations following airplane accidents to be more efficient.

The invention claimed is:

1. A combined emergency beacon and flight recorder device for an aircraft, comprising a combined emergency beacon and flight recorder; and a frame having at least one outer side face fitted with a solar panel and configured to fit into a housing created in an airfoil element of the aircraft; and wherein the combined device is ejectable and at least one of the following: buoyant or fitted with a flotation device.

2. The combined emergency beacon and flight recorder device for an aircraft, as claimed in claim 1, further comprising a battery, for supplying the emergency beacon and the flight recorder with power, said battery being connected to the solar panel, the device thus comprising a stand-alone power supply whether the device is in position in the aircraft or has been ejected from the aircraft.

3. The combined emergency beacon and flight recorder device for an aircraft, as claimed in claim 1, further comprising a stiffening structure having stiffness to serve as a structural element of the airfoil and make the device resistant to impacts.

4. The combined emergency beacon and flight recorder device for an aircraft, as claimed in claim 1 having a ratio of weight to lifting area configured to provide the combined emergency beacon and flight recorder device with lift such that, once ejected, its descent is slowed.

5. The combined emergency beacon and flight recorder device for an aircraft, as claimed in claim 1, further comprising a aerodynamic braking module deployable after ejection of the combined emergency beacon and flight recorder device from the aircraft.

6. The combined emergency beacon and flight recorder device for an aircraft, as claimed in claim 1, having a mass-to-volume ratio to provide buoyancy.

7. The combined emergency beacon and flight recorder device for an aircraft, as claimed in claim 1, further comprising a connecting module without electrical contact for connecting the combined emergency beacon and flight recorder device to systems of the aircraft by at least one of optical or radio connection.

8. The combined emergency beacon and flight recorder device for an aircraft, as claimed in claim 1, further comprising a disconnectable electrical connection module for connecting the combined emergency beacon and flight recorder device electrically to systems of the aircraft.

9. The combined emergency beacon and flight recorder device for an aircraft, as claimed in claim 1, further comprising a boxed sandwich structure incorporating the emergency beacon and the flight recorder and forming all or part of said flotation device.

10. The combined emergency beacon and flight recorder device for an aircraft, as claimed in claim 1, further comprising a device for measuring at least one of acceleration or impact or rate of descent and a jettisoning device configured to activate when at least one of acceleration or rate of descent exceeds a threshold value.

11. The combined emergency beacon and flight recorder device for an aircraft, as claimed in claim 1, further comprising a complementary power supply source powered by at least one of following renewable energy: wind or wave energy.

12. An aircraft comprising a combined emergency beacon and flight recorder device as claimed in claim 1, wherein the combined emergency beacon and flight recorder device is formed as a structural element of said airfoil element of said aircraft.

13. The aircraft as claimed in claim 12 wherein the combined emergency beacon and flight recorder device comprises solar panels on at least one of the following: both its side faces or is formed as an aerodynamic panel element on both faces of said airfoil element.

14. The aircraft as claimed in claim 12, wherein said airfoil element is a vertical stabilizer of the aircraft.

15. The aircraft as claimed in claim 12, further comprising a module for receiving the frame of the combined emergency beacon and flight recorder device in the form of a construction forming a structural element of the airfoil element.

16. The aircraft as claimed in claim 15, wherein the construction is U-shaped and wherein the combined emergency and flight recorder device is housed inside the U-shaped construction as a removable drawer module.

17. An aircraft comprising a combined emergency beacon and flight recorder device as claimed in claim 1, wherein the combined emergency beacon and flight recorder device is formed as an aerodynamic panel element on at least one face of said airfoil element.

18. The combined emergency beacon and flight recorder device for an aircraft, as claimed in claim 1, wherein the stiffening structure is a honeycomb type stiffening structure.

* * * * *